United States Patent [19]
Dubois et al.

[11] Patent Number: 5,472,920
[45] Date of Patent: Dec. 5, 1995

[54] THERMAL BARRIERS, MATERIAL AND PROCESS FOR THEIR PRODUCTION

[75] Inventors: Jean-Marie Dubois, Pompey; Philippe Cathonnet, Avignon, both of France

[73] Assignee: Societe Nouvelle de Metallisation Industries, Avignon, France

[21] Appl. No.: 171,298

[22] Filed: Dec. 22, 1993

[30] Foreign Application Priority Data

Dec. 23, 1992 [FR] France ..................... 92 15659

[51] Int. Cl.$^6$ ..................... C04B 35/10; C04B 35/48
[52] U.S. Cl. ..................... 501/103; 501/104; 501/105; 501/127; 252/62; 75/252; 148/437; 420/528; 420/533; 420/537; 420/538; 420/542; 420/548; 420/550; 420/552; 428/539.5; 428/651
[58] Field of Search ..................... 252/62; 501/103, 501/104, 105, 153, 127; 428/650, 633, 539.5, 651; 75/252; 420/542, 533, 537, 538, 550, 528, 548, 552; 148/437

[56] References Cited

U.S. PATENT DOCUMENTS

| Re. 33,876 | 4/1992 | Goward et al. ............ 428/633 |
| 4,565,792 | 1/1986 | Knapp ..................... 501/103 |
| 4,624,831 | 11/1986 | Tommis ................... 501/105 |
| 4,710,246 | 12/1987 | Le Caer et al. ........... 148/437 |
| 5,073,433 | 12/1991 | Taylor .................... 501/80 |
| 5,204,191 | 4/1993 | Dubois et al. ............ 428/650 |

FOREIGN PATENT DOCUMENTS

| 0086330 | 8/1983 | European Pat. Off. . |
| 0504048 | 9/1992 | European Pat. Off. . |
| 1-184261 | 7/1989 | Japan . |
| 92/13111 | 8/1992 | WIPO . |

OTHER PUBLICATIONS

Degiovanni, A., "Identification de la Diffusivité Thermique par L'utilisation des Moments Temporels Partiels", *High Temperature–High Pressures*, vol. 17, pp. 683–689 (1985) no month.

Tsai, A–P. et al., "A Stable Quasicrystal In Al–Cu–Fe System", *Japanese Journal Applied Physics*, vol. 26, No. 9, pp. L1505–L1507 (Sep. 1987).

*Primary Examiner*—Mark L. Bell
*Assistant Examiner*—Michael Marcheschi
*Attorney, Agent, or Firm*—Foley & Lardner

[57] ABSTRACT

The invention relates to the thermal barriers, to a process and material for their production, and to their application. Thermal barriers consist of a material comprising at least one refractory oxide with low thermal diffusivity and at least one quasicrystalline aluminum alloy, the proportion of which represents from 2–30% by volume. They can be produced by deposition of a mixture of refractory oxide and of quasicrystalline alloy in vapor phase, or from a mixture of refractory oxide and quasicrystalline aluminum alloy in the molten state, or else by deposition onto the support to be protected with the aid of an oxygen-gas torch fed with material using a flexible cord which contains the refractory oxide and the quasicrystalline alloy. The applications include the protection of components of aircraft or motor vehicle engines, of aeronautical or aerospace components, of chemical reactors or of electrical households appliances.

14 Claims, 2 Drawing Sheets

THERMAL BARRIERS, MATERIAL AND PROCESS FOR THEIR PRODUCTION

BACKGROUND OF THE INVENTION

1. Field of the Invention

The present invention relates to thermal barriers, to a process and to a material for their production and to their applications.

2. Description of Related Art

Thermal barriers are essential constituents of many mechanical assemblies which withstand large temperature differences: turbocompressors, combustion engines, chemical reactors and the like. They are then intended to prevent excessive heating of certain, generally metallic, components whose surface temperature would, in their absence, exceed an acceptable limit, resulting in surface melting or else a deterioration in their properties.

Thermal barriers generally consist of an oxide or a mixture of oxides of very low thermal conductivity and are produced by deposition of the oxide or mixture of oxides by a chemical or physical route (for example cathode sputtering or plasma torch) on the substrate to be protected. The oxide most frequently employed is zirconia stabilized with yttrium oxide, which withstands very high temperatures. The deposition of zirconia is produced by plasma sputtering using a conventional technique starting with the powdered material. Zirconia exhibits a low thermal diffusivity ($\alpha=10^{-6}$ m$^2$/s). However, it has a relatively high density $\rho$, which constitutes a disadvantage in some applications: moreover, some of its mechanical properties, such as hardness and resistance to wear and to abrasion are low. Another oxide which can be employed as a thermal barrier is alumina stabilized with another oxide such as, for example, titanium dioxide $TiO_2$. Alumina has a density which is lower than that of zirconia, and a diffusivity and a specific heat which are higher than that of zirconia, but its mechanical properties are not satisfactory.

The use of stainless steels and of certain refractory steels to form thermal barriers is also known. These offer thermal insulation properties but have a high density.

In the majority of devices equipped with thermal barriers the cyclic variation in temperature is the determining factor with regard to the lifetime and the reliability of the barrier. In fact, the latter is subjected to temperature variations of high amplitude (from the temperature at rest to the nominal operating temperature) and of long periodicity (for example several hours), but which can be produced over very brief periods as, for example, when a combustion engine is started up. A temperature modulation of smaller amplitude but very fast cycling is generally superimposed on these abrupt changes as, for example, in a motor vehicle engine, where the combustion/exhaust cycle takes place with a period of the order of a few tens of hertz.

This then results in a very great fatigue of the thermal barrier because of the cyclic mechanical stresses generated by the difference in thermal expansion of, on the one hand, the barrier support and, on the other hand, the material constituting the barrier. The damage very generally affects the thermal barrier rather than the underlying metal support, since the difference in expansion coefficient is likely to give rise to tensile stresses in the barrier, essentially when it consists of an oxide. The damage is concentrated in the barrier, near the substrate/barrier interface, where the shear stresses are highest. Cracks which are parallel to the interface are then produced and result in the separation of the barrier. The disappearance of its protective role can have a catastrophic effect, for example if it causes melting of the underlying metal. To limit or eliminate these disadvantages it has therefore been proposed to interpose a bonding layer consisting of a metallic material between the metal support and the thermal barrier. The choice of a metallic material exhibiting an expansion coefficient which is intermediate between that of the substrate and that of the material forming the thermal barrier makes it possible to reduce the temperature gradient at the interface. The choice of a metal alloy which becomes plastic in the temperature region in which the interfacial stresses can constitute a threat to the behaviour of the thermal barrier makes it possible in practice to eliminate the effects of the temperature gradient at the interface. The material most conventionally employed in the industry belongs to the class of the MCrAlY alloys where M denotes a metal such as nickel. However, the need to use a bonding layer in combination with the layer of material forming the actual thermal barrier presents a disadvantage insofar as the dimensions of the finished article subjected to thermal shocks cannot exceed certain upper limits. The addition of a bonding layer then results in a decrease in the dimensions of the substrate, and this can be detrimental to the other properties of the article.

A new category of alloys has more recently been proposed as a thermal protection component, which are quasicrystalline aluminum alloys whose thermal diffusivity is close to, or even lower than that of zirconia, and which become superplastic from 650° C. onwards, some of them retaining this superplasticity up to about 1200° C.

A quasicrystalline alloy is an alloy comprising one or more quasicrystalline phases which are either quasicrystalline phases within the strict meaning, or approximating phases (EP-A-521,138, Dubois et al). Quasicrystalline phases within the strict meaning are phases exhibiting symmetries of rotation which are normally incompatible with the symmetry of translation, that is to say symmetries of axis of rotation of order 5, 8, 10 and 12, these symmetries being disclosed by radiation diffraction. By way of example, the icosahedral phase of point group $m\overline{35}$ and the decagonal phase of point group 10/mmm may be mentioned.

The approximating phases or approximating compounds are true crystals insofar as their crystallographic structure remains compatible with the symmetry of translation, but which on the electron diffraction pattern exhibit diffraction figures whose symmetry is close to the 5-, 8-, 10- or 12-fold axes of rotation.

Among these phases there may be mentioned by way of example the orthorhombic phase $O_1$, characteristic of an alloy which has the atomic composition $Al_{65}Cu_{20}Fe_{10}Cr_5$, whose unit lattice constants expressed in nm are: $a_0(1)=$ 2.366, $b_0(1)=1.267$, $c_0(1)=3.252$. This orthorhombic phase $O_1$ is known as approximating to the decagonal phase. Furthermore it is so close to the latter that it is impossible to distinguish its x-ray diffraction pattern from that of the decagonal phase. It is also possible to mention the rhombohedral phase with constants $a_R=3.208$ nm, $\alpha=36°$, present in the alloys of composition close to $Al_{64}Cu_{24}Fe_{12}$, based on the number of atoms. This phase is a phase approximating to the icosahedral phase. It is also possible to mention orthorhombic phases $O_2$ and $O_3$ with respective constants $a_0(2)=$ 3.83, $b_0(2)=0.41$, $c_0(2)=5.26$ and $a_0(3)=3.25$, $b_0(3)=0.41$, $c_0(3)=9.8$, in nanometers, which are present in an alloy of composition $Al_{63}Cu_{17.5}Co_{17.5}Si_2$ based on the number of atoms, and also the orthorhombic phase $O_4$ with constants $a_0(4)=1.46$, $b_0(4)=1.23$, $c_0(4)=1.24$, in nanometres, which is formed in the alloy of composition $Al_{63}Cu_8Fe_{12}Cr_{12}$, based on the number of atoms. It is also possible to mention a phase C, of cubic structure, very frequently seen to coexist with the approximating or true quasicrystalline phases. This phase, which is formed in some Al-Cu-Fe and Al-Cu-Fe-Cr alloys, consists of a superstructure, by chemical ordering of the alloy elements on the aluminum sites, the latter forming a Cs-Cl type structure and with lattice constant $a_1=0.297$ nm. A diffraction pattern for this cubic phase has been published for a sample of pure cubic phase of composition $Al_{65}Cu_{20}Fe_{15}$, based on the number of atoms. It is also possible to mention a phase H of hexagonal structure, which is derived directly from the C phase, as shown by the epitaxy relationships observed by electron microscopy between crystals of the C and H phases and the simple relationships which link the crystal lattice constants, namely $a_H=3\sqrt{2}\alpha_1/\sqrt{3}$ (to within 4.5%) and $c_H=3\sqrt{3}\alpha_1/2$ (to within 2.5%). This phase is isotypical of a hexagonal phase, written ΦAlMn, discovered in Al-Mn alloys containing 40% by weight of Mn.

The cubic phase, its superstructures and the phases derived therefrom constitute a class of phases approximating to the quasicrystalline phases of nearby compositions.

All these quasicrystalline alloys can be employed as a thermal barrier. In addition, by virtue of their superplasticity properties, in some cases up to about 1200° C., they can furthermore be employed as a bonding layer for conventional thermal barriers consisting of oxides. However, the melting temperature of these alloys is lower than the temperatures reached by some articles to be protected during thermal cycles. The barrier is then destroyed. Consequently these materials are suitable for forming thermal barriers only for some uses.

SUMMARY OF THE INVENTION

The objective of the present invention is to overcome this disadvantage by proposing a thermal barrier ensuring a thermal protection which is at least as good as that of the materials employed for thermal barriers in the prior art and capable of being employed even at high temperatures.

Another object of the invention is a process for producing the said thermal barriers.

A further object of the invention is a material for the production of the said thermal barriers.

Finally, a subject of the invention is various applications of the thermal barriers.

DETAILED DESCRIPTION

Figure 1:
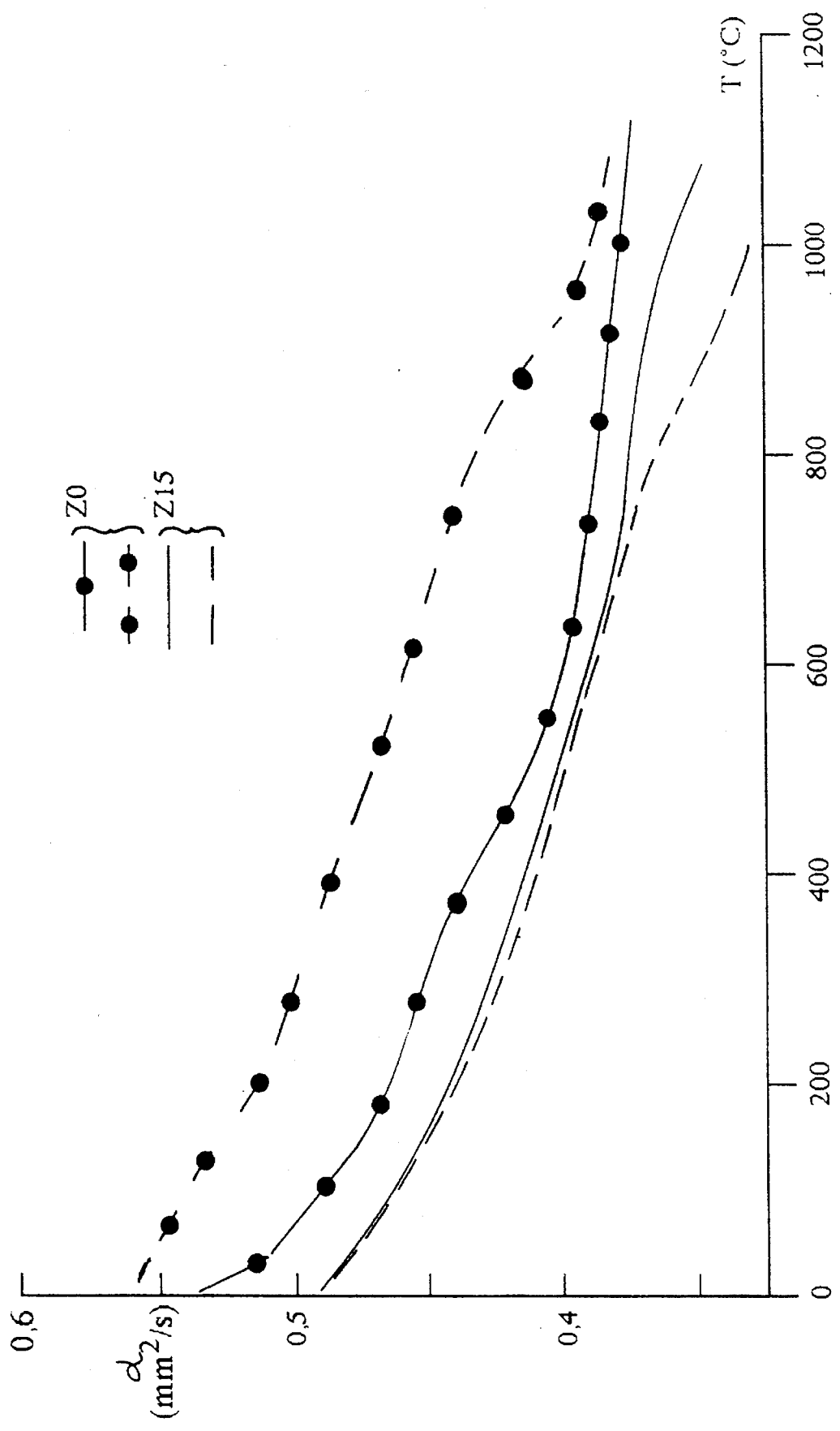
FIG. 1 shows the change in thermal diffusivity as a function of temperature for specimens Z0 (curves carrying black circles) and Z15 (curves carrying no circles) during heating (solid curves) and cooling (broken curves).

A thermal barrier according to the present invention is characterized in that it consists of a material comprising at least one refractory oxide which has a low thermal diffusivity and at least one quasicrystalline aluminum alloy, the proportion of quasicrystalline alloy representing from approximately 2 to approximately 30% by volume.

The refractory oxide preferably has a thermal diffusivity lower than 5 mm²/s, more particularly lower than 2 mm²/s.

Zirconia and alumina are refractory oxides which are particularly preferred for the material constituting the thermal barriers of the present invention. Zirconia may be employed by itself or mixed with a stabilizing oxide such as MgO, CaO or $Y_2O_3$. It is preferably employed by itself, or mixed with a quantity of stabilizing oxide which is smaller than or equal to 3% by weight. Alumina is stabilized by adding $TiO_2$.

The quasicrystalline alloy employed for the material of the present invention is an aluminum alloy comprising at least 80% by volume of one or a number of quasicrystalline phases, whether they be quasicrystalline phases within the strict meaning or approximating phases such as defined above. The proportion of quasicrystalline alloy in the material forming the thermal barriers of the invention is preferably between approximately 5 and approximately 20% by volume.

The quasicrystalline alloy is advantageously chosen from those exhibiting one of the following nominal compositions, in which the proportions are given on the basis of number of atoms:

$Al_aCu_bFe_cY_eI_g$, (I) in which Y denotes at least one element selected from V, Mo, Ti, Zr, Nb, Cr, Mn, Ru, Rh, Ni, Mg, W, Si and the rare earths, I denotes the unavoidable production impurities, $0 \leq g \leq 2$, $14 \leq b \leq 30$, $7 \leq c \leq 20$, $0 \leq e \leq 10$, $c+e \geq 10$ and $a+b+c+e+g=100\%$ based on the number of atoms;

$Al_aCu_bFe_cX_dY_eI_g$, (II), in which X denotes at least one element chosen from B, C, P, S, Ge and Si, Y denotes at least one element chosen from V, Mo, Ti, Zr, Nb, Cr, Mn, Ru, Rh, Ni, Mg, W, Hf, Ta and the rare earths, I denotes the unavoidable production impurities, $0 \leq g \leq 2$, $14 \leq b \leq 30$, $7 \leq c20$, $0 \leq d \leq 5$, $21 \leq b+c+e \leq 45$, and $a+b+c+d+e+g=100\%$ based on the number of atoms;

$Al_aPd_bMn_cX_dY_eT_fI_g$ (III) in which X denotes at least one metalloid chosen from B, C, Si, Ge, P and S; Y denotes at least one metal chosen from Fe, Mn, V, Ni, Cr, Zr, Hf, Mo, W, Nb, Ti, Rh, Ru, Re, and Ta; T is at least one rare earth; I denotes the unavoidable production impurities; with $a+b+c+d+e+g=100$ atom %; $15 \leq b \leq 25$; $6 \leq c \leq 16$; $21 \leq b+c+e \leq 45$; $0 \leq f \leq 4$; $0 \leq g \leq 2$ and $0 \leq d < 5$;

$Al_aCu_bCo_cX_dY_eT_fI_g$ (IV) in which X denotes at least one metalloid chosen from B, C, Si, Ge, P and S; Y denotes at least one metal chosen from Fe, Mn, V, Ni, Cr, Zr, Hf, Mo, W, Nb, Ti, Rh, Ru and Re; T is at least one rare earth; I denotes the unavoidable production impurities; with $a+b+c+d+e+g=100$ atom %; $14 \leq b \leq 27$; $8 \leq c \leq 24$; $28 \leq b+c+e \leq 45$; $0 \leq f \leq 4$; $0 \leq d \leq 5$ and $0 \leq g \leq 2$;

$Al_aX_dY_eI_g$, (V) in which X denotes at least one element chosen from B, C, P, S, Ge and Si, Y denotes at least one element chosen from V, Mo, Cr, Mn, Fe, Co, Ni, Ru, Rh and Pd, I denotes the unavoidable production impurities, $0 \leq g \leq 2$; $0 \leq d \leq 5$; $18 \leq e \leq 29$ and $a+d+e+g=100\%$ based on the number of atoms;

$Al_aCu_bCo_{b'}(B,C)_cM_dN_eI_f$ (VI) in which M denotes at least one element chosen from Fe, Cr, Mn, Ni, Ru, Os, Mo, V, Mg, Zn and Pd, N denotes at least one element chosen from W, Ti, Zr, Hf, Rh, Nb, Ta, Y, Si, Ge and the rare earths, and $a \leq 50$, $0 \leq b \leq 14$, $0 \leq b' \leq 22$, $0 \leq b+b' \leq 30$, $0 \leq c \leq 5$, $8 \leq d30$ and $c+d \geq 10$.

The thermal barriers can be produced by different processes.

According to a first process a thermal barrier of the present invention is produced by performing a deposition of a mixture of refractory oxide and of quasicrystalline alloy in vapour phase. The mixing in vapour phase may be obtained by cathode sputtering. This operation may be performed either by starting with two different targets, one consisting of the refractory oxide, the other consisting of the quasicrystalline alloy, or by starting with a single target obtained from a material consisting of a mixture of refractory oxide and of quasicrystalline aluminum alloy in appropriate proportions.

According to another process the deposition on the support to be protected is performed by starting with a mixture of refractory oxide and of quasicrystalline aluminum alloy in the molten state, the said mixture in the molten state being obtained by melting a powder with the aid of a suitable device and being sprayed onto the surface of the substrate. A particularly advantageous means for implementing this technique is a plasma torch which enables the refractory oxide, more particularly zirconia, to be easily melted. It is particularly advantageous to employ a powder consisting of a mixture of refractory oxide powder and of quasicrystalline aluminum alloy powder in appropriate proportions. It is also possible to inject the refractory oxide and the quasicrystalline alloy into the plasma separately. In this case the method employed for the injection and the relative proportion of the materials allow the degree of homogeneity of the barrier to be controlled.

According to a third process the deposition on the support to be protected is performed with the aid of an oxygen-gas torch fed with material using a flexible cord which contains a refractory oxide and one or a number of quasicrystalline alloys as defined above, the proportion of quasicrystalline alloy not exceeding 30% by volume. The cord is produced by a technique described, for example, in FR-A-2,673,871 by starting with a refractory oxide as defined above and with one or a number of quasicrystalline alloys as defined above, the constituents being reduced to powder beforehand, for example by grinding, so that the particle size of the refractory oxide is as fine as possible and that Of the quasicrystalline alloy is preferably of the order of 10 to 40 μm. Organic adjuvants and an organic sheath are employed to impart good mechanical behaviour to the cord. When the end of the cord is introduced into the torch flame, melting of the quasicrystal particles ensures a coating of the oxide particles, which will subsequently produce the cohesion of the barrier and its resistance to thermal shocks. A volume fraction of quasicrystal of between 15 and 20% by volume is particularly preferred for the cord.

The above techniques can be advantageously implemented by starting with a material consisting of a mixture of powder of at least one refractory oxide which has a diffusivity lower than 5 mm$^2$/s, preferably lower than 2 mm$^2$/s, and of powder of at least one quasicrystalline aluminum alloy as defined above, in which material the proportion by volume of quasicrystalline alloy is from approximately 2 to approximately 30% by volume, and the powders have a particle size which allows the mixture to flow well and a particle diameter distribution of between 10 and 45 μm.

A particularly advantageous material for the production of thermal barriers is a powder as defined above, in which the refractory oxide is pure zirconia or a stabilized zirconia with a low content of stabilizing oxide. The content of stabilizing oxide, chosen from CaO, MgO and $Y_2O_3$, is advantageously lower than or equal to 3% by weight.

The use of these particular pulverulent materials for the production of thermal barriers according to the invention is particularly desirable when the deposition on the substrate is performed with the aid of a plasma torch.

The thermal barriers of the present invention consist of a material which is homogeneous in respect of heat conduction, since the thermal conductivities of their constituents (oxide and quasicrystalline alloy) are equivalent. On the other hand, they are heterogeneous insofar as the mechanical properties at high temperature are concerned, since the quasicrystalline alloy becomes superplastic, or even liquid, at very high temperatures, whereas the oxide remains a solid, but brittle material. The oxide thus assures the mechanical behaviour of the thermal barrier. By becoming superplastic or liquid, the quasicrystalline alloy absorbs the stresses generated at the barrier/substrate interface and at the joints of oxide particles at high temperatures during thermal shocks, and does so proportionately better when the mixture is physically homogeneous on a finer scale. These properties make it possible to reduce substantially the thickness of the bonding layer, and even to eliminate this layer, employed in the case of conventional barriers consisting solely of an oxide.

The thermal barriers of the present invention are particularly useful for the protection of components of aircraft engines, of aeronautical or aerospace components, of components of motor vehicle engines, of chemical reactors or of electrical household appliances.

The present invention will be illustrated in greater detail by the following nonlimiting examples.

EXAMPLE 1

Preparation of a Quasicrystalline Alloy

A quasicrystalline alloy having the atomic composition $Al_{68}Cu_{10}Fe_{11}Cr_{11}$ was produced conventionally in powder form by spraying the liquid alloy which had the same composition with a jet of argon. The powder obtained has a particle size distribution centred on 35 to 40 μm. The thermal diffusivity α of the alloy is $0.7\times10^{-6}$ m$^2$/s at ambient temperature.

EXAMPLE 2

Preparation of Cylindrical Samples of Thermal Barriers According to the Invention Measurement of Thermal Diffusivity The quasicrystalline alloy was that of Example 1.

Two commercial oxides supplied by the Stark company, were employed: a zirconia containing 20% by weight of yttrium oxide $Y_2O_3$ (samples Z0, Z2, Z5 and Z15), and an alumina containing 3% by weight of titanium dioxide $TiO_2$ (samples T0, T2, T5 and T15). The particle size distribution was centred on 35 to 40 μm.

Specimens were prepared by hot plasma spraying according to a conventional process. The alloy powder and the oxide powder were injected separately into the tip of the plasma flame by two injectors situated on each side of the plasma. The mixing of the two components of the barrier took place inside the plasma. The flow rate of the injector employed for the quasicrystalline powder was set at different values to obtain values of volume fraction of alloy in the thermal barriers close to 0%, 2%, 5% and 15% respectively. The injector employed for the oxide powder had a flow rate which was identical for all the samples.

The depositions were performed by setting the plasma torch parameters in a conventional manner, namely:

| | |
|---|---|
| oxide powder flow rate | 2.5 kg/h |
| torch power | 32 kW |

| | |
|---|---|
| current | 450 A |
| torch-substrate distance | 120 mm |

The cylindrical specimens obtained have a diameter of 10 mm and a thickness of 2 mm.

The thermal diffusivity of the cylindrical specimens was first of all measured at ambient temperature. It was determined with the aid of a laboratory device combining the laser flash method with an Hg-Cd-Te semiconductor detector. The laser was employed to supply power pulses of between 20 J and 30 J of $5 \times 10^{-4}$ s duration, to heat the front face of the specimen. The semiconductor thermometer was used to detect the thermal response on the opposite face of the specimen. The thermal diffusivity was deduced from the experiments using the method described by A. Degiovanni, High Temp.—High Pressure, 17 (1983) 683. The characteristics of the cylindrical specimens and the results of the measurements are collated in Table 1 below. It is clearly seen that the thermal conduction of the zirconia/quasicrystalline alloy mixture is very close to that of zirconia by itself. Furthermore, the thermal conduction of the alumina/quasicrystalline alloy mixture is lower than that of alumina by itself.

TABLE 1

| N° | Oxide type | Quasicristalline alloy % by vol. | Thermal diffusivity $\alpha$ (mm²/s) ± 5% |
|---|---|---|---|
| Z0 | $ZrO_2$ + 20% $Y_2O_3$ | 0 | 0,50 |
| Z2 | $ZrO_2$ + 20% $Y_2O_3$ | 2 | 0,45 |
| Z5 | $ZrO_2$ + 20% $Y_2O_3$ | 5 | 0,46 |
| Z15 | $ZrO_2$ + 20% $Y_2O_3$ | 15 | 0,46 |
| T0 | $Al_2O_3$ + 3% $TiO_2$ | 0 | 1,90 |
| T2 | $Al_2O_3$ + 3% $TiO_2$ | 2 | 1,55 |
| T5 | $Al_2O_3$ + 3% $TiO_2$ | 5 | 1,50 |
| T15 | $Al_2O_3$ + 3% $TiO_2$ | 15 | 1,40 |

Figure 2:
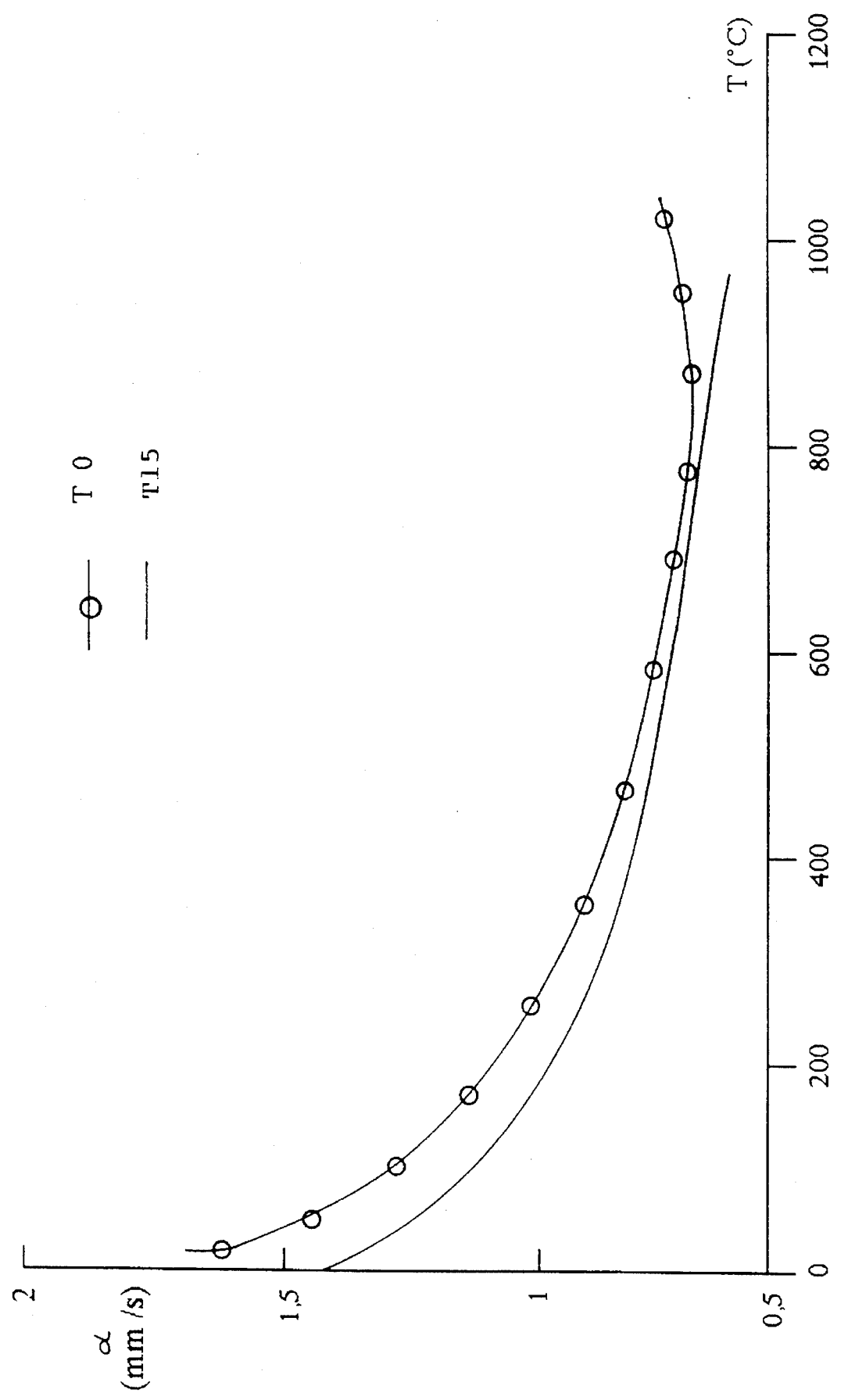
FIG. 2 shows the change in thermal diffusivity as a function of temperature for specimens T0 (curve carrying circles) and T15 (curve without circles) during heating.

The thermal diffusivity was also measured by providing the above experimental device with an oven. The rate of heating was set at 5° C./min and the measurements were performed in the 20° C.–1150° C. temperature region. The results are collated in FIGS. 1 and 2.

It is clearly seen that the addition of a quasicrystalline alloy, on the one hand to zirconia, on the other hand to alumina, does not deteriorate the thermal barrier properties of the materials, but that it can even improve them in some cases.

EXAMPLE 3

Preparation of Thermal Barriers on a Steel Plate

Evaluation of Resistance to Thermal Shocks

The quasicrystalline alloy employed for the thermal barrier and, where appropriate, for the bonding layer, was that of Example 1.

Various oxides were employed. In all cases the particle size distribution was centred on 35 to 40 μm. The specimens consisted of a 5 cm×5 cm thermal barrier deposited on a steel plate 2 mm in thickness.

The characteristics of the specimens are collated in Table 2, which follows.

In the case of the specimens whose number bears the index a or b, the deposition of the barrier was performed according to the procedure of Example 2 on a steel plate, after a conventional preparation of the surface by sanding with carborundum and application of a bonding layer of 0.2 mm thickness consisting of the alloy of Example 1.

In the case of the specimens whose number bears the index c, the deposition of the barrier was performed using the procedure of Example 2, but by spraying a previously prepared mixture of zirconia containing 3% by weight of magnesium oxide and of quasicrystalline alloy of Example 1, after a conventional preparation of the surface by sanding with carborundum, but without application of a bonding layer.

TABLE 2

| N° | Oxide type | Quasicryst. alloy % by vol. | Barrier thickness in mm | Bonding underlayer |
|---|---|---|---|---|
| ZA0a | $ZrO_2$ +20% $Y_2O_3$ | 0 | 0,4 | 0,2 mm |
| ZA0b | $ZrO_2$ +20% $Y_2O_3$ | 0 | 0,4 | 0,2 mm |
| ZA15a | $ZrO_2$ +20% $Y_2O_3$ | 15 | 2 | 0,2 mm |
| ZA15b | $ZrO_2$ +20% $Y_2O_3$ | 15 | 2 | 0,2 mm |
| ZA2a | $ZrO_2$ +20% $Y_2O_3$ | 2 | 0,4 | 0,2 mm |
| ZA5a | $ZrO_2$ +20% $Y_2O_3$ | 5 | 0,4 | 0,2 mm |
| ZA5c | $ZrO_2$ +3% MgO | 5 | 0,4 | non |
| ZA15c | $ZrO_2$ +3% MgO | 51 | 0,4 | non |

The specimens formed by the barriers deposited on a steel plate which were thus obtained were subjected to thermal shocks. For this purpose the plates were fastened at 90° from each other onto a circular refractory support 80 cm in diameter. This support was rotated at a rate of 4 rev/min. Two oxygen-propane torches were placed 10 cm from each other so that on each rotation of the support the specimens were subjected to the torch flames.

The nozzle of the first torch encountered was 3 cm away from the barrier and that of the second torch was 8 cm away. The gas flow rates were adjusted so that the surface temperature of the barriers should approach 1350° C. during the period of residence in the flame of the first torch. The impact diameter of the flame of the first torch was estimated at 1.5 cm, from the dimension of the area heated to high temperature.

The second torch covered the surface of the specimens entirely. After having left the region of this second torch the barriers cooled by natural convection in air to reach a temperature of 250° C. before again encountering the first torch. Bearing in mind the dimensions indicated above and the rate of rotation, the rate of heating during the thermal shock was close to $10^{4°}$ C./s with an amplitude of approximately 1100° C. It should be noted, furthermore that this maximum temperature exceeds the melting temperature of the quasicrystalline alloy employed.

Despite these very severe conditions the barriers ZA5a, ZA15a, ZA15b, ZA5c and ZA15c, that is to say all the barriers consisting of a material containing at least 5% of quasicrystalline alloy, resisted during 400 shocks until the test was stopped. Barrier ZA2a withstood approximately 150 shocks. On the other hand, barriers ZA0a and ZA0b withstood 5 shocks and 20 shocks respectively.

Specimen ZA15a was inspected after suitable polishing with a conventional microscope before the heat treatment and after 400 shocks. The corresponding micrographs (120 magnification) show that the material after 400 thermal shocks remains quite similar to the initial material, which shows its good resistance to thermal shocks.

Macrographs at magnification of 4 of the surface state of barriers ZA0b and ZA15b, as apparent after 20 thermal shocks in the case of ZA0b and after 400 thermal shocks in the case of ZA15b were produced. No deterioration in the surface state of sample ZA15b can be seen in these macrographs, whereas numerous cracks appear on the sample ZA0b.

These results confirm that the barriers of the present invention not only exhibit a thermal diffusivity which is at least as low as that of the materials employed as thermal barriers in the prior art but that, in addition, they exhibit a considerably improved resistance to thermal shocks. The improvement in this resistance to thermal shocks is found even in the absence of any bonding layer. However, the latter may be useful for imparting other properties, such as, for example, corrosion resistance. Improvement in the resistance to thermal shocks is also found with the use of pure zirconia or of zirconia containing a very small proportion of stabilizing oxide. The invention thus makes it possible to avoid quantities of yttrium oxide of the order of 20% which are necessary in the prior art when zirconia is' employed for forming thermal barriers.

We claim:

1. A thermal barrier comprising at least one refractory oxide which has a low thermal diffusivity and at least one quasicrystalline aluminum alloy containing at least 80% by volume of at least one quasicrystalline phase, the proportion of quasicrystalline alloy representing from approximately 2 to approximately 30% by volume.

2. A thermal barrier according to claim 1, wherein the refractory oxide has a thermal diffusivity lower than 5 mm²/s.

3. A thermal barrier according to claim 1, wherein the refractory oxide is selected from the group consisting of pure zirconia, stabilized zirconia and stabilized alumina.

4. A thermal barrier according to claim 1, wherein the refractory oxide is selected from the group consisting of zirconia stabilized by addition of not more than 3% by weight of MgO, CaO or $Y_2O_3$ and alumina stabilized by addition of $TiO_2$.

5. A thermal barrier according to claim 1, wherein the proportion of quasicrystalline alloy is from approximately 5 to approximately 20% by volume of quasicrystalline aluminum alloy.

6. A thermal barrier according to claim 1, wherein the quasicrystalline alloy is selected from the following group consisting of those which exhibit one of the following nominal compositions in which the proportions are given based on numbers of atoms:

$Al_aCu_bFe_cY_eI_g$, (I) in which Y denotes at least one element selected from the group consisting of V, Mo, Ti, Zr, Nb, Cr, Mn, Ru, Rh, Ni, Mg, W, Si and the rare earths, I denotes production impurities, $0 \leq g \leq 2$, $14 \leq b \leq 30$, $7 \leq c \leq 20$, $0 \leq e \leq 10$, $c+e \geq 10$ and $a+b+c+e+g=100\%$ based on the number of atoms;

$Al_aCu_bFe_cX_dY_eI_g$, (II), in which X denotes at least one element selected from the group consisting of B, C, P, S, Ge and Si, Y denotes at least one element selected from the group consisting of Zr, Nb, Cr, Mn, Ru, Rh, Ni, Mg, W, Hf, Ta and the rare earths, I denotes production impurities, $0 \leq g \leq 2$, $14 \leq b \leq 30$, $7 \leq c20$, $0 \leq d \leq 5$, $21 \leq b+c+e \leq 45$, and $a+b+c+d+e+g=100\%$ based on the number of atoms;

$Al_aPd_bMn_cX_dY_eT_fI_g$ (III) in which X denotes at least one metalloid selected from the group consisting of B, C, Si, Ge, P and S; Y denotes at least one metal selected from the group consisting of Fe, Mn, V, Ni, Cr, Zr, Hf, Mo, W, Nb, Ti, Rh, Ru, Re, and Ta; T is selected from at least one rare earth; I denotes production impurities; with $a+b+c+d+e+g=100$ atom %; $15 \leq b \leq 25$; $6 \leq c \leq 16$; $21 \leq b+c+e \leq 45$; $0 \leq f \leq 4$; $0 \leq d \leq 5$ and $0 \leq g<2$;

$Al_aCu_bCo_cX_dY_eT_fI_g$ (IV) in which X denotes at least one metalloid selected from the group consisting of B, C, Si, Ge, P and S; Y denotes at least one metal selected from the group consisting of Fe, Mn, V, Ni, Cr, Zr, Hf, Mo, W, Nb, Ti, Rh, Ru and Re; T is selected from at least one rare earth; I denotes production impurities; with $a+b+c+d+e+g=100$ atom %; $14 \leq b \leq 27$; $8 \leq c \leq 24$; $28 \leq b+c+e \leq 45$; $0 \leq f \leq 4$; $0 \leq d \leq 5$ and $0 \leq g \leq 2$;

$Al_aX_dY_eI_g$, (V) in which X denotes at least one element selected from the group consisting of B, C, P, S, Ge and Si; Y denotes at least one element selected from the group consisting of V, Mo, Cr, Mn, Fe, Co, Ni, Ru, Rh and Pd; I denotes production impurities, $0 \leq g \leq 2$; $0 \leq d \leq 5$; $18 \leq e \leq 29$ and $a+d+e+g=100\%$ based on the number of atoms; and $Al_aCu_bCo_{b'}(B,C)_cM_dN_eI_f$ (VI) in which M denotes at least one element selected from the group consisting of Fe, Cr, Mn, Ni, Ru, Os, Mo, V, Mg, Zn and Pd; N denotes at least one element selected from the group consisting of W, Ti, Zr, Hf, Rh, Nb, Ta, Y, Si, Ge and the rare earths; I denotes production impurities; and $a \leq 50$, $0 \leq b \leq 14$, $0 \leq b' \leq 22$, $0 \leq b+b' \leq 30$, $0 \leq c \leq 5$, $8 \leq d \leq 30$ and $c+d \geq 10$.

7. A material for use in the production of thermal barriers, comprising a mixture of powder of at least one refractory oxide which has a thermal diffusivity lower than 5 mm²/s, and of powder of at least one quasicrystalline aluminum alloy, in which the proportion by volume of quasicrystalline alloy is from approximately 2 to approximately 30% by volume, and the powders have a particle size which allows the mixture to flow and a particle diameter distribution of between 10 and 45 μm.

8. Material according to claim 7, wherein the refractory oxide is selected from pure zirconia and zirconia stabilized with a stabilizing oxide selected from the group consisting of CaO, MgO and $Y_2O_3$, the content of said stabilizing oxide being lower than or equal to 3% by weight.

9. A material for use in the production of thermal barriers, in the form of a flexible cord, said material consisting essentially of a mixture of (i) at least one quasicrystalline aluminum alloy in the form of powder and of (ii) at least one finely divided powder selected from pure zirconia and stabilized zirconia, the aluminum alloy representing not more than 30% by volume.

10. A material according to claim 9, wherein the refractory oxide has a thermal diffusivity lower than 5 mm²/s.

11. A material according to claim 7, wherein the refractory oxide is selected from the group consisting of pure zirconia, stabilized zirconia and stabilized alumina.

12. A material according to claim 7, wherein the refractory oxide is selected from the group consisting of zirconia stabilized by addition of not more than 3% by weight of MgO, CaO or $Y_2O_3$ and alumina stabilized by addition of $TiO_2$.

13. A material according to claim 7, wherein the proportion of quasicrystalline alloy is from approximately 5 to approximately 20% by volume of quasicrystalline aluminum alloy.

14. A material according to claim 9, wherein the proportion of quasicrystalline alloy is from approximately 5 to approximately 20% by volume of quasicrystalline aluminum alloy.

* * * * *